(12) United States Patent
Gemelli et al.

(10) Patent No.: US 9,154,446 B2
(45) Date of Patent: Oct. 6, 2015

(54) DEVICE AND METHOD FOR SWITCHING DATA TRAFFIC IN A DIGITAL TRANSMISSION NETWORK

(75) Inventors: Riccardo Gemelli, Settimo M.se (IT); Luigi Ronchetti, Como (IT); Andrea Paparella, Busto Arsizo (IT); Vincenzo Sestito, Milan (IT)

(73) Assignee: Alcatel Lucent, Boulogne-Billancourt (FR)

( * ) Notice: Subject to any disclaimer, the term of this patent is extended or adjusted under 35 U.S.C. 154(b) by 307 days.

(21) Appl. No.: 13/819,027

(22) PCT Filed: Sep. 28, 2011

(86) PCT No.: PCT/EP2011/066913
§ 371 (c)(1),
(2), (4) Date: Feb. 26, 2013

(87) PCT Pub. No.: WO2012/041924
PCT Pub. Date: Apr. 5, 2012

(65) Prior Publication Data
US 2013/0182716 A1 Jul. 18, 2013

(30) Foreign Application Priority Data

Sep. 30, 2010 (EP) .................................. 10306069

(51) Int. Cl.
*H04L 12/935* (2013.01)
*H04L 12/933* (2013.01)
*H04L 12/931* (2013.01)

(52) U.S. Cl.
CPC ............ *H04L 49/30* (2013.01); *H04L 49/1523* (2013.01); *H04L 49/3072* (2013.01); *H04L 49/606* (2013.01)

(58) Field of Classification Search
None
See application file for complete search history.

(56) References Cited

U.S. PATENT DOCUMENTS 5,436,886 A * 7/1995 McGill .......................... 370/219
5,696,761 A * 12/1997 Kos et al. ...................... 370/386

(Continued)

FOREIGN PATENT DOCUMENTS

| EP | 1701495 | 9/2006 |
| JP | 2004064619 | 2/2004 |
| JP | 2009212724 | 9/2009 |
| WO | 02/03590 | 1/2002 |

OTHER PUBLICATIONS

Chiussi, F. et al; Scalable Electronic Packet Switches; IEEE Journal on Selected Areas in Communications; IEEE Service Center; Piscataway, US; vol. 21, No. 4; May 1, 2003; pp. 486-500; XP011065608; ISSN: 0733-8716; DOI: DOI:10.1109/JSAC.2003.810497.

(Continued)

*Primary Examiner* — Dang Ton
*Assistant Examiner* — Ronald H Davis
(74) *Attorney, Agent, or Firm* — Patti & Malvone Law Group, LLC

(57) ABSTRACT

A network element for a digital transmission network is proposed. The network element contains two switching matrices for switching data cells, as well as ingress ports that receive TDM traffic flow and packet traffic flow and segment the traffic flows into cells. A control system for controlling the configuration of the ingress ports and the switching matrices controls the ingress ports, in case of no failure of the switching matrices, to forward the TDM traffic flows to both switching matrices and to split the packet traffic flow over the two switching matrices.

10 Claims, 9 Drawing Sheets

(56) References Cited

U.S. PATENT DOCUMENTS

| | | | |
|---|---|---|---|
| 6,643,297 B1* | 11/2003 | Sproat et al. | 370/498 |
| 6,941,486 B1* | 9/2005 | Kopp et al. | 714/4.1 |
| 7,274,696 B1* | 9/2007 | Sikdar | 370/391 |
| 7,292,580 B2* | 11/2007 | Ramamurthy et al. | 370/395.42 |
| 2001/0033572 A1* | 10/2001 | Caldara | 370/395 |
| 2002/0089926 A1* | 7/2002 | Kloth | 370/220 |
| 2003/0185201 A1* | 10/2003 | Dorgan | 370/352 |
| 2004/0170173 A1* | 9/2004 | Pan et al. | 370/392 |
| 2006/0285536 A1* | 12/2006 | Gerard Pauwels | 370/352 |
| 2008/0002669 A1* | 1/2008 | O'Brien et al. | 370/352 |
| 2010/0046534 A1 | 2/2010 | Kurosaki et al. | |
| 2012/0210164 A1* | 8/2012 | Gara et al. | 714/10 |

OTHER PUBLICATIONS

International Telecommunication Union; Network node interface for the synchronous digital hierarchy (SDH); ITU-T Recommendation G.707/Y.1322 (Oct. 2000); 184 pages.

RFC 791; Internet Protocol, Darpa Internet Program, Protocol Specification; Information Sciences Institute, University of Southern California, 4676 Admiralty Way, Marina del Rey, California 90291; Sep. 1981; 50 pages.

Book Gigabit Networking, Craig Partridge, published by Addison-Wesley, Oct. 30, 1993 in Chapter 5.1 to 5.4; Wide Area Cell Networking; pp. 89-101.

* cited by examiner

DEVICE AND METHOD FOR SWITCHING DATA TRAFFIC IN A DIGITAL TRANSMISSION NETWORK

FIELD OF THE INVENTION

The invention relates to a device and a method for switching data traffic in a digital transmission network.

BACKGROUND

In digital transmission networks, data of a traffic flow is transmitted from a source host, for example a computer or a communication device, to a destination host, which may be another single host in case of a unicast, multiple hosts forming a multicast group, or a broadcast domain. A traffic flow is considered as the data transmitted in a specific transport connection or a media stream. A traffic flow is a logical equivalent to a call from a source host to a destination host or a connection between the source host and the destination host. Each host is connected via a physical connection to at least one node of the digital transmission network. Digital transmission networks comprise different nodes, wherein a physical connection between two nodes is called a link. A single node may be connected to multiple other nodes via respective links. For transmitting a traffic flow from the source host to the destination host, the traffic flow may have to be switched by intermediate nodes along a transmission path connecting the source host and the destination host.

A first technology for transmitting data of a traffic flow is based on the principle called time division multiplexing (TDM). An example for a network using TDM for transmission is an SDH (Synchronous Digital Hierarchy) network as described in the document "ITU-T Recommendation G.707/Y.1322 (10/2000)—Network node interface for the synchronous digital hierarchy (SDH)". Payload data of a traffic flow is written at the source host into a number time slots that form a data unit called virtual container (VC), which may be considered a TDM signal. A virtual container is of fixed size and transmitted by the SDH network from the source host to the destination host at a certain periodicity. Thus, a virtual container represents a certain data rate for transmitting data of a traffic flow from the source host to the destination host. For example, a virtual container specified as a VC-4 provides a data rate of 140 Mbit/s. For transmitting virtual containers between two network nodes, virtual containers are multiplexed into transmission frames called synchronous transport modules STM by time division multiplexing, and the STMs are transmitted from one node to another node. Also, an STM may be considered a TDM signal. The node receiving an STM at an ingress port switches a VC to an egress port by TDM switching. This means, that once a switching node is configured, the time slots of a VC received within an STM at an ingress port are switched to a specific egress port depending on the position of the time slots of the VC within the STM. Thus, the TDM technology is a circuit switching technology. At the egress port, the VC is multiplexed into another STM, which then is transmitted to another node. Thus, a VC represents a data traffic flow transmitted from a source host to a destination host along a path, while an STM represents one or more traffic flows transmitted from one node to another node. For switching a VC, a TDM matrix may be used, which is typically implemented as a memory. Each matrix input writes data into predetermined portions of the memory within a predetermined time interval, while each matrix output reads data from predetermined portions of the memory within predetermined time slots. Another type of switch that may be used for switching a VC is a so called cell switch. Timeslot of a received VC are segmented into data cells, the data cells are stored in a queue, and the data cells are switched from an input of an agnostic matrix to an output of an agnostic matrix depending on the configuration of the matrix. At the output, the data cells are reassembled to time slots of a VC again and then the VC is transmitted within an STM. Each input port of the cell switch is able to write data cells into a predefined memory portion corresponding to a single output port at a predefined data rate, for a example a data rate DRIN. The input ports are able to write data cells into the predefined memory portion of the output port in parallel. The single output port is able to read out data cells from the predefined memory portion at another data rate DROUT. The data rate DROUT at which the output port is able to read out data cells is smaller than the sum of the data rates at which all the input ports are able to write into the predefined memory portion.

In networks using the above described method of TDM for data transmission, the incoming data rate of data received at an ingress port and the outgoing data rate of data to be transmitted at an egress port of a specific node are constant. Furthermore, the dimensioning of the switching node and the switching matrix, is chosen such, that all incoming data is switched and transmitted at the output ports without any data loss.

In circuit switched networks, a high availability of the network resources is demanded in order to avoid data loss. Therefore, components of network resources are provided redundantly. For switching, two switching matrices are provided in a network node, which are both configured in the same way. The same switched data is duplicated and forwarded to input ports of both switching matrices, while switched data is read from an output port of only one switching matrix. In case of a failure of one switching matrix, data is read from an output port of the surviving switching matrix.

A second technology for transmitting data of a traffic flow is based on packet switching, for example based on the Internet Protocol as specified in the paper "RFC 791; Internet Protocol, Darpa Internet Program, Protocol Specification; Information Sciences Institute, University of Southern California, 4676 Admiralty Way, Marina del Rey, Calif. 90291; September 1981". A data packet carries payload data of the data traffic, as well as overhead information identifying a source address and a destination address. A traffic flow is a sequence of packets sent from a particular source host to a particular destination host, which may be a unicast destination or a multicast destination. As previously mentioned, a traffic flow is a logical equivalent to a call from a source host to a destination host or a connection between the source host and the destination host. At a node acting as a switching node, the data packets are switched from an ingress port to an egress port according to the content of their overhead information. Data packets are not fixed to a certain size, but of variable size, and do not arrive with a constant frequency at a node, but randomly.

Data packets are not fixed to a certain size, but of variable size, and do not arrive with a constant frequency at a node, but randomly. Therefore, the data rate caused by data packets received at a network node is not constant. The data rate of received data packets during a short time interval may be high compared to the average data rate of a longer time interval. Such a shorter time interval is called a burst. Data packets may be switched by cell switches, wherein a data packet is segmented into data cells for switching. The data rate during the burst time interval may exceed the data rate at which a cell switch is able to switch the data cells representing the data packets. In such a case, a data packet may have to be dropped at an ingress port resulting in data loss. Alternatively, data packets may be stored in an ingress buffer at the switching node and then read out from the buffer and switched during a later time interval, during which the data rate of received data packets is lower than the data rate at which the node is capable to switch data packets. The effect caused by the buffering of the data packets is a delay of the data packets. Thus, the buffering at the ingress affects the latency of the data traffic carried by the data packets. Furthermore, in the case that multiple packet traffic flows shall be switched from different ingress ports to a same egress port, the sum of the data rates of these packet traffic flows may exceed the data rate at which data can be read out at an output port of the cell switch.

For handling bursts of data cells caused by bursts of data packets, a common technique is to provide at each egress port an egress buffer for intermediate storing of these data cells. As it is discussed in the book "Gigabit Networking, Craig Partridge, published by Addison-Wesley, Oct. 30, 1993" in Chapter 5.1 to 5.4, when using a cell switch, it is of advantage to use egress buffers instead of ingress buffers for handling packets bursts. This reduces the amount of time that data cells have to be stored in a buffer before they can be transmitted at the egress ports. Therefore, egress buffers are to be preferred over ingress buffers for handling bursts of data packets.

SUMMARY

It is an object of the invention, to provide a switching device capable of switching TDM signals as well as data packets using cell switches in an efficient manner.

Proposed is a network element for a digital transmission network. The network contains a number of ingress ports and a number of egress ports, including packet ingress ports, packet egress ports, TDM ingress ports and TDM egress ports.

At a TDM ingress port, a time division multiplex traffic flow is received and segmented into data cells carrying the TDM traffic flow. At a packet traffic ingress port, one or more packet traffic flows are received. A packet traffic flow is segmented into data cells carrying the corresponding packet traffic flow.

At a packet egress port, received data cells and/or data packets reassembled from the received data cells are stored in a buffer.

The network element contains a first and a second switching matrix. Each matrix is able to switch data cells from each ingress ports to each egress ports.

At a TDM ingress port, a time division multiplex traffic flow is received and segmented into data cells carrying the TDM traffic flow. At a packet traffic ingress port, one or more packet traffic flows are received. A packet traffic flow is segmented into data cells carrying the corresponding packet traffic flow.

At an egress port, received data cells and/or data packets reassembled from the received data cells are stored in a buffer.

The network element contains a control system for controlling the configuration of the ingress ports, the egress ports and the switching matrices. The control system is able to control, the TDM ingress port, to forward the data cells carrying the TDM traffic flow to the first and the second switching matrix, and the packet traffic ingress port, to split the packet traffic flow, by forwarding a first fraction of the data cells carrying the packet traffic flow to the first switching matrix and forwarding a second fraction of the data cells carrying the packet traffic flow to the second switching matrix.

In order to grasp the advantages of the proposed network element, the following considerations have to be taken into account.

Data packets are not fixed to a certain size, but of variable size, and do not arrive with a constant frequency at a node, but randomly. Therefore, the data rate caused by data packets received at a network node is not constant. The data rate of received data packets during a short time interval may be high compared to the average data rate of a longer time interval. Such a shorter time interval is called a burst. Data packets may be switched by cell switches, wherein a data packet is segmented into data cells for switching. The data rate during the burst time interval may exceed the data rate at which a cell switch is able to switch the data cells representing the data packets. In such a case, a data packet may have to be dropped at an ingress port resulting in data loss. Alternatively, data packets may be stored in an ingress buffer at the switching node and then read out from the buffer and switched during a later time interval, during which the data rate of received data packets is lower than the data rate at which the node is capable to switch data packets. The effect caused by the buffering of the data packets is a delay of the data packets. Thus, the buffering at the ingress affects the latency of the data traffic carried by the data packets. Furthermore, in the case that multiple packet traffic flows shall be switched from different ingress ports to a same egress port, the sum of the data rates of these packet traffic flows may exceed the data rate at which data can be read out at an output port of the cell switch.

In order to compensate for a burst of data packets arriving at a node, the node relies on the egress buffers at the egress ports, for storing the received data cells or the reassembled data packets during the burst. At a later point of time, at which data packets are received at a data rate lower than the data rate of transmission at the egress port, the amount of data cells or data packets stored at the egress buffer may be reduced, by reading them out from the buffer and transmitting them. The capability of handling bursts of data packets therefore strongly depends on the chosen size of the egress buffer.

It has to be furthermore considered, that a switching matrix is able to switch data cells only at a certain limited data rate. Data packets, which arrive at different ingress ports and that shall be switched in forms of data cells to a same egress port, may have an overall data rate that exceeds the data rate at which data cells can be read out at an output port of the matrix and forwarded to the egress port. This may cause a drop of data packets resulting in data loss. Even if the egress buffers at the egress ports would still have free storing capacity, data packets would have to be dropped at the ingress ports during a burst due to the limited switching capacity of the switching matrix. In other words, the switching matrix imposes a bottleneck which not all data cells of the incoming traffic may be able to pass in case of too much data traffic being present to be switched. Although a possible solution would be to use a larger switching matrix able to switch data cells at a larger data rate, this would result in higher production costs for the node. Also, another solution would be to provide ingress buffers at the ingress ports for storing incoming data packets or their corresponding data cells during a burst. But as it has been outlined previously, using egress buffers instead of ingress buffers reduces the latency of the traffic flows to be switched and transmitted.

The advantages of the invention are manifold. By splitting the packet traffic flow, not only the transmission capacity of only one but of both switching matrix is used for switching data cells of the split packet traffic flow. Therefore, for the split packet traffic flow, the time needed for switching the corresponding data cells is reduced compared to the known manner of switching, according to which all data cells are copied by the ingress ports to both matrices for switching, and then only one of the copied data cells is transmitted after switching. Thus, the packet traffic flow is switched at a data rate twice the switching data rate of the known manner of switching. Therefore, the risk of data loss, due to the necessity of having to drop data packets at the ingress port during a burst or due to a switching of data traffic from too many ingress ports to an egress port, is reduced. Furthermore, in the case that ingress buffers are provided at the ingress ports for storing data packets or data cells, the risk of ingress buffer congestion caused during a burst of data packets is reduced, since the packet traffic flow is switched at a higher rate compared to the known manner of switching. Further still, the splitting of the packet traffic flow for switching results also in a smaller latency of the data packets carrying the packet traffic flow, compared to the known manner of switching. An even further advantage is, that in case of no failure of the switching matrices, the packet traffic flow is switched at a higher rate without having to provide a larger switching matrix compared to the known manner of switching, thus avoiding an increase of costs. Further still, the power consumption of the second matrix is used for switching data cells that actually are recombined at the egress ports to data packets which then are actually transmitted, contrary to the known manner of switching. Therefore, the ratio of the amount of power vs. the switched data rate is increased for switching the packet traffic flow compared to the known manner of switching.

To summarize the above, it is a design goal when designing switching systems is to reach maximum performances at minimum cost. Maximum performances can be reached with output queuing which requires a speedup of N and thus costly forwarding resources in the switch, this would result in higher production costs for the node. Minimum performances can be obtained with the input buffering which on the other hands minimizes cost. More complex buffering strategies just mentioned in the introduction do not solve this dilemma.

DESCRIPTION OF EMBODIMENTS

Figure 1:
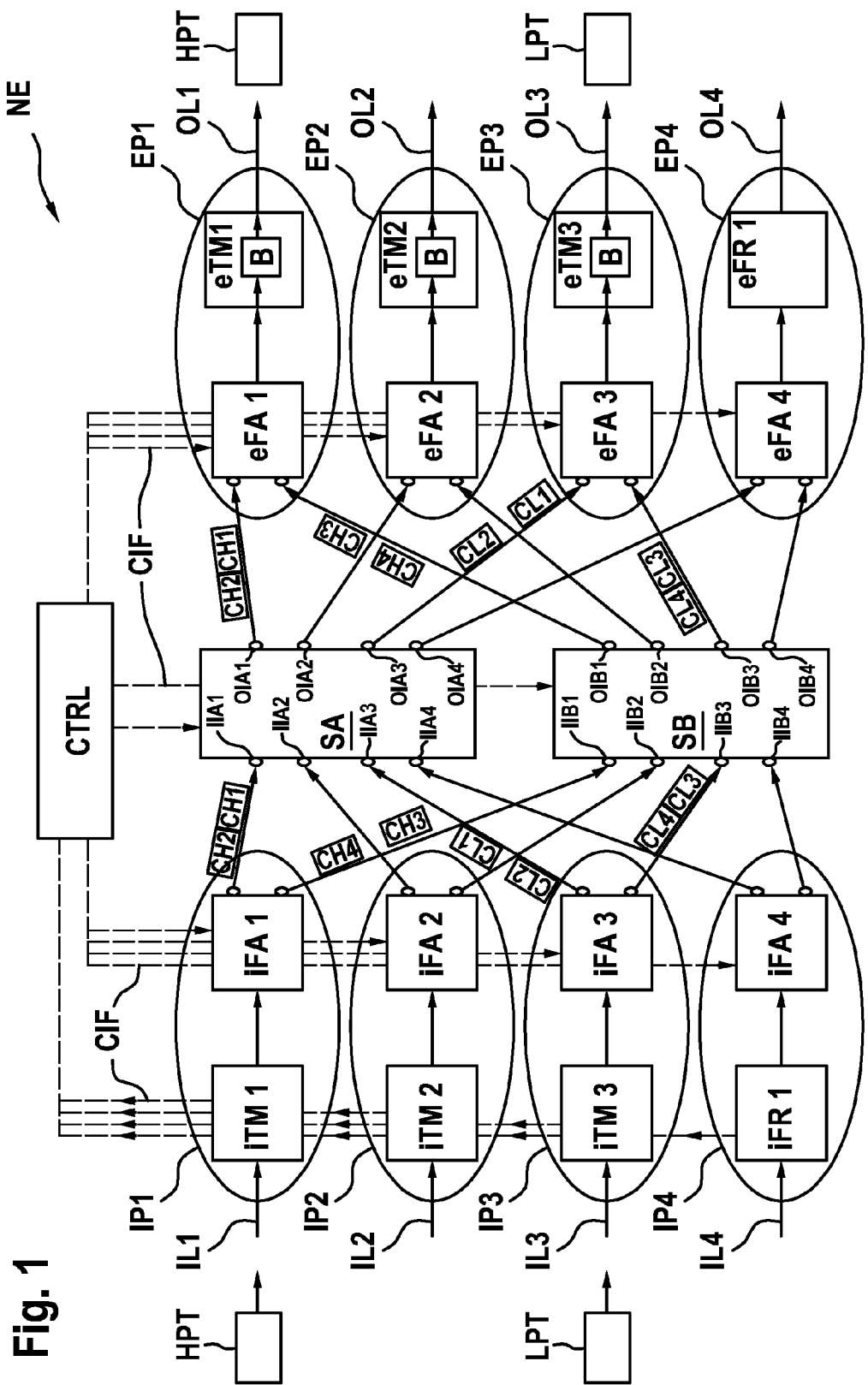
FIG. 1 shows a schematic diagram of a proposed network element in a first configuration state in case of no failure.

FIG. 1 shows the proposed network element NE. The network element contains ingress ports IP1, IP2, IP3 that are able to receive data packets of packet traffic flows. Each of the ingress ports IP1, IP2, IP3 is connected to a respective incoming line IL1, IL2, IL3 leading to other network elements. Each ingress port IP1, IP2, IP3 contains an ingress traffic manager iTM1, iTM2, iTM3, that maps received data packets into data cells of fixed size. Each ingress traffic manager iTM1, iTM2, iTM3 is connected to a respective ingress fabric access iFA1, iFA2, iFA3, also contained in the ingress ports IP1, IP2, IP3. Each ingress port IP1, IP2, IP3 is connected to a respective input interface IIA1, IIA2, IIA3 of a first switching matrix SA. Furthermore, each ingress port IP1, IP2, IP3 is connected to a respective input interface IIB1, IIB2, IIB3 of a second switching matrix SB. Via the ingress fabric accesses iFA1, iFA2, iFA3, the ingress ports IP1, IP2, IP3 forward data cells to the input interfaces IIA1, IIA2, IIA3, IIB1, IIB2, IIB3 of the switching matrices SA, SB.

Preferably, the fabric access is a component that is conveniently distinct from the traffic manager in an Agnostic matrix. The functions of the fabric access are the following: 1) perform the protection switching when triggered from the control system; 2) perform the protection of frames carried on the backplane high speed links between the matrix and the fabric accesses via suitable redundancy insertion (e.g. Reed-Solomon codes); 3) Segmentation of cells into chunks and interleaving of chunks in ingress fabric access; 4) De-interleaving of chunks and reassembly of cells in egress fabric accesses. Function 1) is an essential feature in the invention while other features can be neglected since they allows an implementation of Agnostic system switching matrix which uses less memory but is not an essential feature in the invention. In applicant technology implementation the fabric access is convenient since costly traffic managers are not instantiated in TDM cards where the framers are directly connected to fabric accesses but in general also an implementation where traffic manager and fabric access are implemented into the same device is possible. The proposed solution applies in the same manner to the case where a traffic manager iTM1 and a fabric access iFA1 are integrated into a same component, i.e. the features of the two components are merged into one.

The network element NE furthermore contains egress ports EP1, EP2, EP3 for transmitting data packets. Each egress port EP1, EP2, EP3 contains a respective egress fabric access eFA1, eFA2, eFA3. Each egress fabric access eFA1, eFA2, eFA3 is connected to a respective output interface OIA1, OIA2, OIA3 of the first switch SA and a respective output interface OIB1, OIB2, OIB3 of the second switch SB. The egress fabric accesses eFA1, eFA2, eFA3 read out switched data cells from the output interfaces OIA1, OIA2, OIA3, OIB1, OIB2, OIB3 of the matrices SA, SB. Furthermore, each egress ports EP1, EP2, EP3 contains an egress traffic manager eTM1, eTM2, eTM3. Each egress traffic manager eTM1, eTM2, eTM3 reassembles received data cells to reassembled data packets, which then are stored in a respective egress buffer B. Alternatively, the received data cells are stored in the buffer B before reassembling them to data packets. The egress traffic managers eTM1, eTM2, eTM3 transmit the reassembled data packet over respective outgoing lines OL1, OL2, OL3, to which they are connected, to other network elements.

The network element NE contains also one or more ingress ports IP4, that is able to receive via an incoming line IL4 a TDM traffic flow, such as for example an STM. The ingress port IP4 contains an ingress framer iFR1 for extracting time slots of a VC from the received STM. The time slots are then segmented into data cells by the ingress framer iFR1, and the data cells are forwarded to an ingress fabric access iFA4. The ingress fabric access iFA4 is connected to an input interface IIA4 of the first switching matrix SA and an input interface IIB4 of the second switching matrix SB. The ingress fabric access iFA4 forwards the data cells carrying the TDM traffic flow to both switching matrices SA, SB, in order to provide a 1+1 EPS protection. One ore more egress ports EP4 are also contained in the network element NE. The egress port EP4 contains an egress fabric access eFA4 and an egress framer eFR1. The egress fabric access iFA4 is connected to an output interface OIA4 of the of the first switching matrix SA and an output interface OIB4 of the second switching matrix SB. The egress fabric access eFA4 reads data cells out from one of the output interfaces OIA4, OIB4 and forwards the read data cells to an egress framer eFR1. The egress framer recombines the data cells to timeslots of a VC, maps the VC into an STM and transmits the STM.

The network element NE contains a control system CTRL, which controls the configuration of the ingress ports IP1, IP2, IP3, IP4 the egress ports EP1, EP2, EP3, EP4 and the switches SA, SB. The control system CTRL is connected to the ingress ports IP1, IP2, IP3, IP4 the egress ports EP1, EP2, EP3, EP4 and the switches SA, SB via a control interface CIF. The control system CTRL receives configuration requests from a network manager either via data packets received at an ingress traffic manager iTM1, iTM2, iTM3, that analyzes the data packets and sends the configuration requests via the control interface CIF to the control system CTRL. The control system receives also configuration requests from the ingress framer iFR1, which analyzes overhead information of an STM and forwards configuration requests to the control system CTRL via the interface CIF. Alternatively, the control system CTRL receives configuration requests over an interface—not shown in FIG. 1—that is connected to a data communication network.

Preferably, CIR components of Guaranteed and Regulated traffic flows can be set-up by a manager or the control plane (e.g. MPLS E-LSP or MPLS L-LSP) while the EIR component depends on received traffic flows.

Each switching matrix SA, SB is an agnostic matrix, which switches data cells that are received at its input interfaces IIA1, IIA2, IIA3, IIA4, IIB1, IIB2, IIB3, IIB4 to one or more output interfaces OIA1, OIA2, OIA3, OIB1, OIB2, OIB3.

Figure 5:
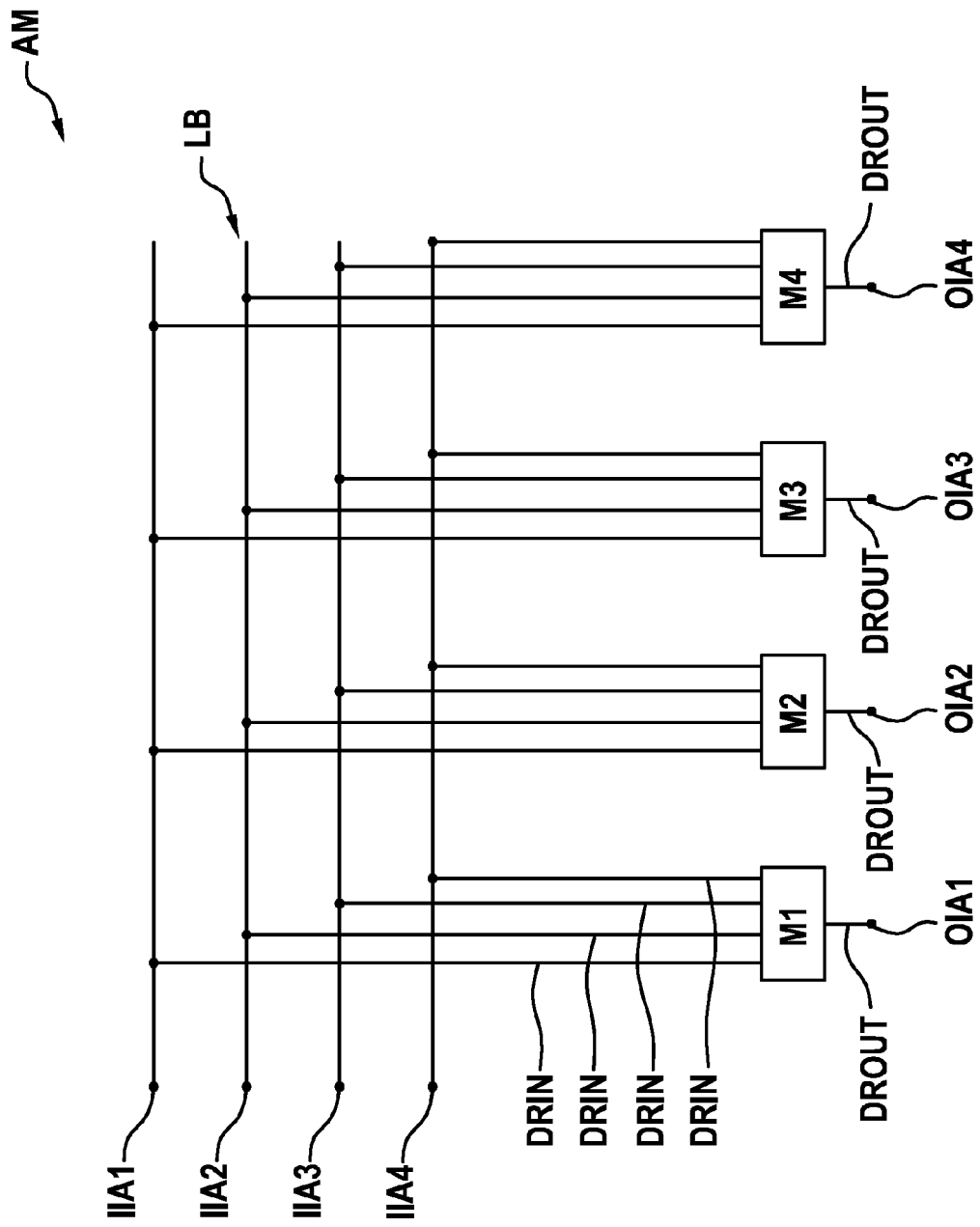
FIG. 5 shows a schematic diagram of an agnostic matrix for switching data cells.

FIG. 5 shows a schematic diagram of an agnostic matrix AM that switches data cells, such as the matrix SA shown in FIG. 1. Each input interface IIA1, . . . , IIA4 is connected to all output interfaces OIA1, . . . , OIA4 via a so called cross bar CB. Via each input interface IIA1, . . . , IIA4, an ingress fabric access connected to the input interface IIA1, . . . , IIA4 is able to write data cells at a data rate DRIN into a respective predefined memory portion M1, M2, M3, M4 of each output interface OIA1, . . . , OIA4. Via each output interface OIA1, . . . , OIA4, each egress fabric access is able to read out data cells from the respective predefined memory portion M1, M2, M3, M4 at a data rate DROUT. The data rate DROUT at a single output interface OIA1 is smaller than sum of the data rates DRIN of all input interfaces IIA1, . . . , IIA4 writing data cells into the predefined memory portion M1.

The matrix shown in the diagram of FIG. 5 is a purely spatial matrix, but the invention can be carried out in the same way with a temporal and spatial matrix which is able to perform both spatial switch and time slot interchange.

Writing of data cells and reading of data cells is coordinated by the control system of the network element, as it will be described in detail hereafter with respect to FIG. 1. The ingress traffic managers iTM1, . . . , iTM 3 each contain an ingress buffer for buffering data cells of incoming packet traffic flows. If an ingress traffic manager iTM1, . . . , iTM 3 has data cells stored in its ingress buffer that have to be switched, the ingress traffic manager wants to write these data cells via its corresponding ingress fabric access iFA1, . . . , iFA3 into predefined memory portions of the output interfaces OIA1, . . . , OIA3 depending on the egress ports EP1, . . . , EP3 to which the data cells shall be switched. The ingress traffic manager iTM1, . . . , iTM3 sends via the interface CIF requests REQ to the egress traffic managers eTM1, . . . , eTM3 of those egress ports, that are connected to the output interfaces OIA1, . . . , OIA3 to which the data cells have to be switched. A request REQ indicates how many data cells an ingress fabric access wants to write into which predefined memory portion within a predefined time interval, for example 9.6 milliseconds. Preferably, the time interval is of 9.6 microseconds length. The egress traffic managers eTM1, . . . , eTM3 receive requests from all ingress traffic managers that want to write data cells into the predefined memory portions of the output interfaces OIA1, . . . , OIA3 they are connected to. The egress traffic managers eTM1, . . . , eTM3 determine, which ingress fabric access iFA1, . . . , iFA3 may write how many data cells into the corresponding memory portions, such that all of these data cells can be read out at the reading data rate at the output interface without having to discard or drop a data cell. Then, as a result of this determination, the egress traffic managers eTM1, . . . , eTM3 indicate the amount of data cells that can be read out by the egress fabric accesses eFA1, . . . , eFA3 during the predetermined time interval, by sending pre-grant messages PGR to the control system CTRL via the interface CIF. The control system then determines that amount of data cells, which an ingress fabric access iFA1, . . . , iFA3 may write into predefined memory portions without exceeding the data rate that can be transmitted by the connection between an ingress fabric access iFA1, . . . , iFA3 and an input interface IIA1, . . . , IIA3. This determined number of data cells is indicated by grant messages GRT to the ingress traffic managers iTM1, . . . , iTM3. The ingress traffic managers iTM1, . . . , iTM3 then write during the predefined time interval the number of data cells indicated in the grant messages into the predefined memory portions of the switch SA, while the egress traffic managers read out these data cells during the predetermined time interval. This method of determining the number of data cells to be written into a memory portion during a predefined time interval is called scheduling. This method of scheduling is performed for successive time intervals each, thus controlling the switching of data cells from the ingress ports to the egress ports. Data cells, which an ingress traffic manager iTM1, . . . , iTM3 wants to write into a predefined memory portion as indicated in the request message, but which it is not allowed to write according to the grant message of the control system CTRL, have to remain in the ingress buffers of the ingress ports IP1, . . . , IP3.

Figure 6:
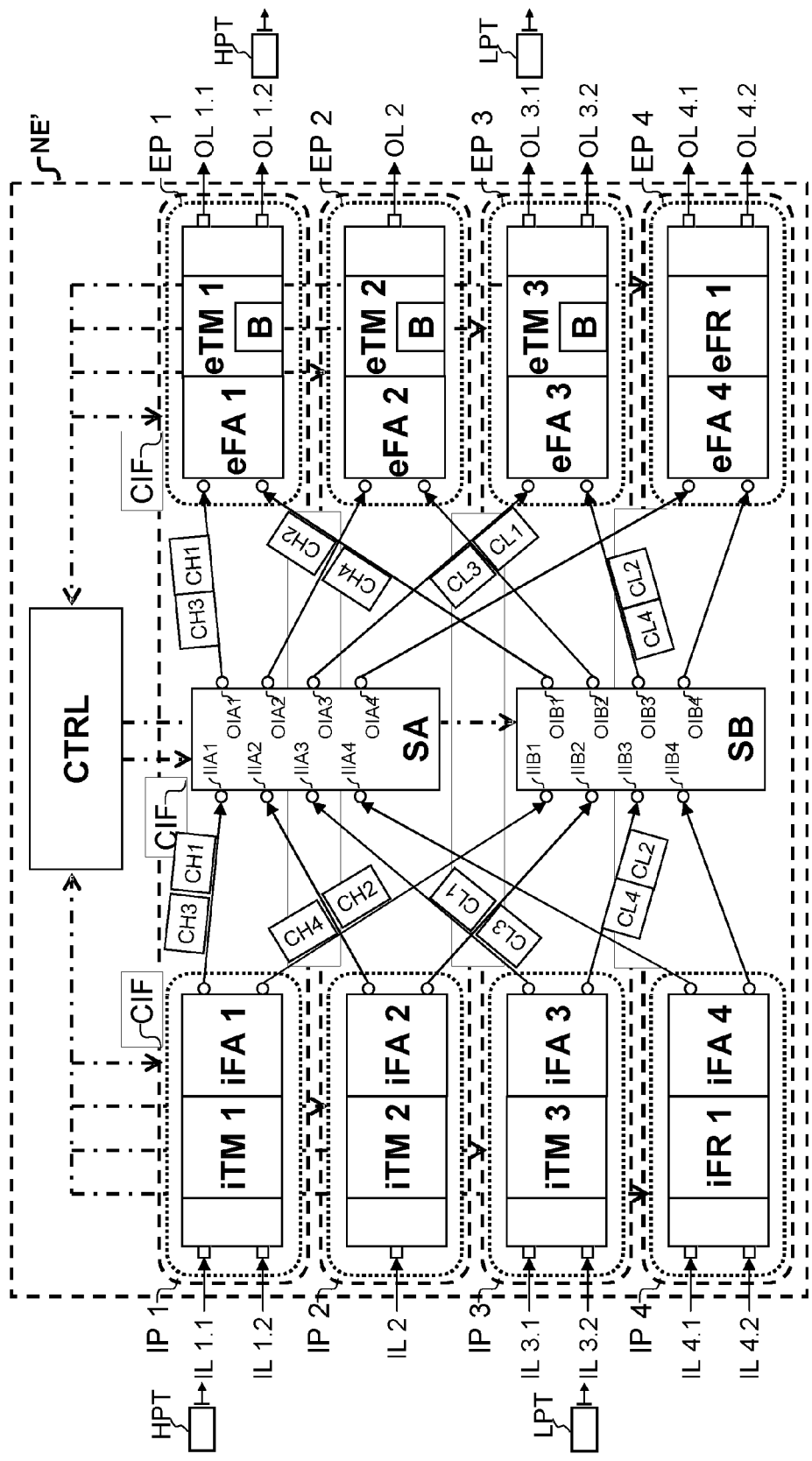
FIG. 6 shows a schematic diagram of the proposed network element in a further first configuration state in case of no failure.

In practice, the difference between what is pre-granted and what is granted remains in the buffers of the input traffic managers. It can be proven, that the proposed invention is beneficial to speedup also where arbitration mechanisms are based on backpressure signals; in those cases, ingress flows are forwarded to egress queues according to flow priorities. FIG. 6 shows a proposed device, in which an ingress port IP1, IP3, IP4 may receive more than one ingress flows at more than one ingress sub-ports IL1.1, IL1.2, IL3.1, IL3.1. For instance, at an egress port there is a queue for high priority and a queue for low priority and according to congestion state of egress queues suitable backpressure signals are generated towards ingresses. Also, in those cases, the speedup ensures better fairness in the distribution of EIR among competing flows.

As an example, consider the case, not explicitly shown in FIG. 6, where there are 3 flows coming from different ingresses—one from IL1.1 of IP1, one from IL1.2 of IP1 and one from IL3.1 of IP3—competing to go to the same egress port OL 4.1 of EP4. Moreover another flow coming from ingress IL 3.2 of IP3 is forwarded to port OL 4.2 of IP4. It is clear that if there is a burst between matrices and EP4, this will limit also the amount of transferred cells of flow coming from IL 3.2, which is not causing any congestion and this is clearly unfair. This congestion take places first at the backplane interface between the matrices and the EP4 since the sum of flows in larger than the capacity of the backplane interface maximum supported rate and then at the buffer of EP4 dedicated to the port OL 4.1. This unfair behaviour will continue until the backpressure action towards the ingresses which restores a fair situation, that is the flow coming from IP 3.2 have not to be shaped since it is not causing congestion. By giving additional speedup, thanks to the invention, the congestion at the backplane interface is more likely removed and this make flow coming from IL 3.2 unaffected from congestion.

FIG. 1 shows the network element in a first configuration state. Both switching matrices SA, SB are working without failure.

At the ingress port IP1, data packets of a high priority traffic flow HPT are received. At the ingress port IP3, data packets of a low priority traffic LPT are received.

At the ingress port IP1, the data packets of the high priority traffic flow are segmented by the traffic manager iTM1 into data cells CH1, CH2, CH3, CH4 carrying data of the high priority traffic HPT. The ingress fabric access iFA1 splits the high priority traffic HPT, by forwarding a fraction CH1, CH2 of the high priority traffic data cells CH1, CH2, CH3, CH4 to the input interface IIA1 of the first switching matrix SA and forwarding another fraction CH3, CH4 of the data cells CH1, CH2, CH3, CH4 to the input interface IIB1 of the second switching matrix SB. Thus, the high priority traffic flow is split among the switches SA, SB for switching.

At the ingress port IP3, the data packets of the low priority traffic flow are segmented by the traffic manager iTM3 into data cells CL1, CL2, CL3, CL4 carrying data of the low priority traffic LPT. The ingress fabric access iFA3 splits the low priority traffic LPT, by forwarding a fraction CL1, CL2 of the low priority traffic data cells CL1, CL2, CL3, CL4 to the interface IIA3 of the first switching matrix SA and forwarding another fraction CL3, CL4 of the data cells CL1, CL2, CL3, CL4 to the interface IIB3 of the second switching matrix SB. Thus, the low priority traffic flow is split among the switches SA, SB for switching.

At the switching matrices SA, SB, the received data cells are switched from the input interfaces IIA1, . . . , IIB4 to the output interfaces OIA1, . . . , OIB4 as previously described. As an exemplary, non limiting example, the switching matrix SA is configured, such that it switches the data cells CH1, CH2 from the input interface IIIA1 to the output interface OIA1, and the data cells CL1, CL2 from the input interface IIA3 to the output interface OIA3.

The switching matrix SB shown in FIG. 1 is configured in the same way as the switching matrix SA. Thus, in this example, the switch SB switches the data cells CH3, CH4 of the high priority traffic flow HPT from the input interface IIB1 to the output interface OIB1, and the data cells CL3, CL4 of the low priority traffic LPT from the input interface IIB3 to the output interface OIB3.

At the egress fabric accesses eFA1, eFA3, the switched data cells are read out from the output ports OIA1, OIA3, OIB1, OIB3 of both matrices SA, SB and forwarded to the egress traffic managers etM1, eTM3. The egress traffic managers etM1, eTM3 store the received data cells in their buffers B. Then, the stored data cells are read out from the buffer B, reassembled to data packets, and the data packets are transmitted over the outgoing lines OL1, OL3. Alternatively, the data cells are first reassembled to data packets, the data packets are stored in the buffer B, and then the data packets are read out from the buffer and then transmitted.

In this example, the data rate, by which the high priority traffic flow is switched by both switching matrices SA, SB of FIG. 1, is twice the data rate that would be achieved, if the high priority traffic flow would not be split but copied and forwarded to both matrices SA, SB for switching. The same holds in this example for the low priority traffic flow. In other words, if the data cells of the traffic flows would not be split by the ingress fabrics iFA1, iFA2 between the switches SA, SB, but if an ingress fabric iFA1, iFA2 would send a copy of each data cell to both matrices for achieving a 1+1 EPS of the data traffics, the data rate for switching the data traffics would only be half of the data rate achieved when using both matrices SA, SB for switching as previously described. Therefore, the proposed configuration applying a splitting of the traffic flows reduces the risk of having to drop data packets at the ingress ports IP1, IP3 in case of data packet bursts. Since each ingress port IP1, IP2, IP3 provides an ingress buffer for buffering data cells, the proposed configuration applying a splitting of the traffic flows reduces the risk of ingress buffer congestion at the ingress ports IP1, IP3.

In other words, the matrix speedup allowed by splitting the cells of the high priority or low priority traffic flow, removes in a faster way the cells from the input ports IP1, IP2, IP3, thus reducing probability that buffering at those ports is needed as well as latency which depends on the maximum number of buffered cells, and in an extreme case, the probability of drop at IP1, IP2 and IP3 due to overcoming the buffer capacity.

Furthermore, since in the proposed configuration only the two data cells CH1, CH2 have to be read out at the single output interface OIB1 instead of the data four data cells CH1, CH2, CH3, CH4 for achieving the same data rate at the switch SA, the risk that the data rate at which data cells are switched onto a single output interface exceeds the data rate at which data cells are read out at the output interface is reduced. This also reduces the risk of data packet loss and ingress buffer congestion.

Figure 2:
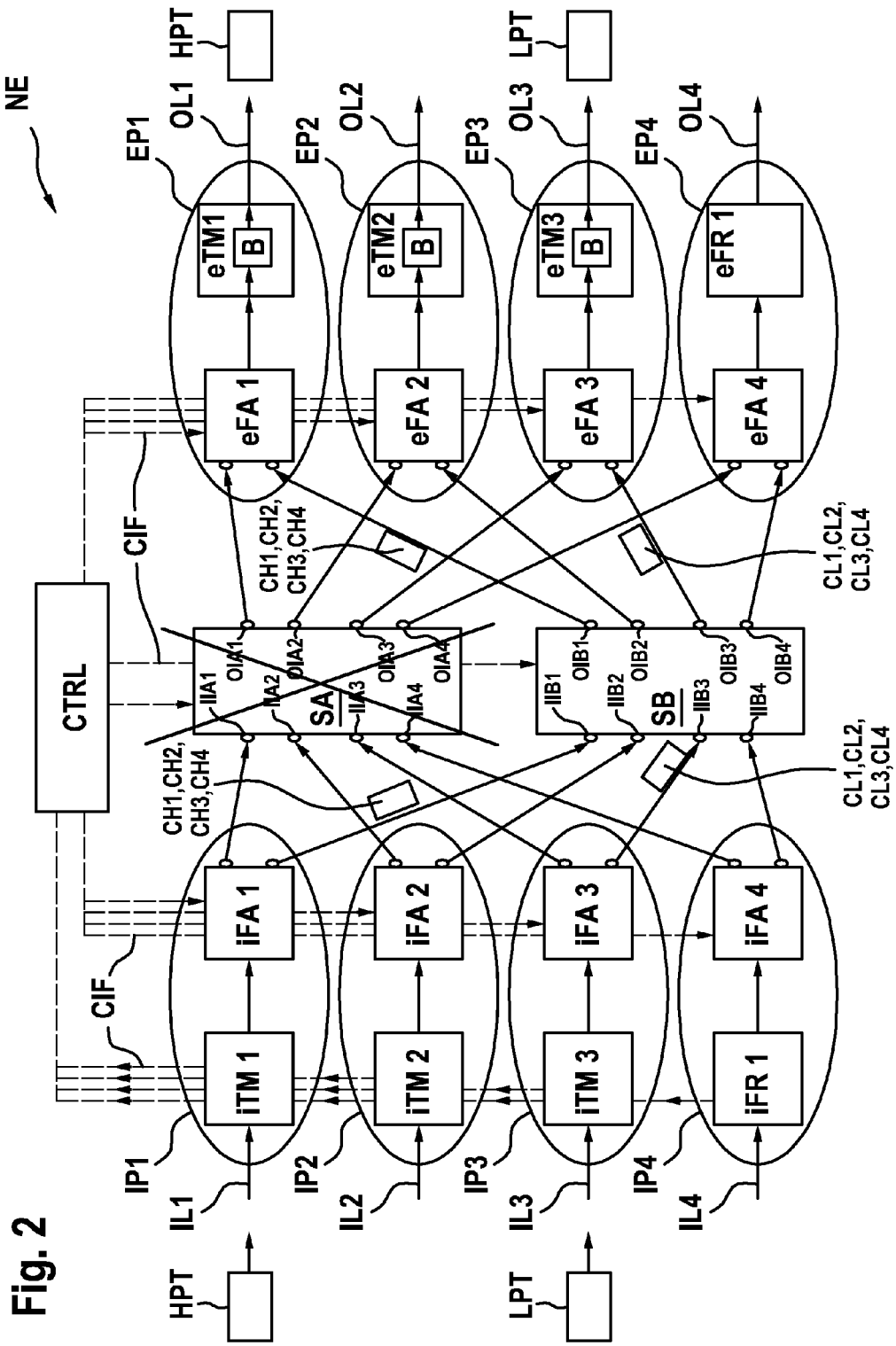
FIG. 2 shows a schematic diagram of the proposed network element in the first configuration state in case of a failure.

FIG. 2 shows the proposed network element NE in the first configuration state. The switching matrix SA is subject to a failure and can therefore not be used for switching. The switching matrix SB is working without failure.

The control system CTRL detects a failure of the switch SA. The control does so, by for example analyzing the content of data cells that are received at the egress fabric accesses eFA1, eFA3. If the content of the data cells is encoded at the ingress fabric accesses iFA1, iFA2 by a Reed-Solomon-Code (RSC) before switching of the data cells, the control system CTRL decodes the content of the switched data cells using the RSC and is thus able to determine an error rate of the switched data cells.

In other words, if data cells or their mapping at lower layer protocols is protected by means of an appropriate redundancy, the control system CTRL is able to check their integrity and is thus able to determine an error rate of the switched data cells. For instance the content of backpanel links between FA and matrix can be protected by adding a redundancy in the form of a Reed-Solomon-Code (RSC): a first RSC is added from iFA and data integrity checked (and possibly a correction performed) at ingress of the matrix while a second RSC is added at matrix egress and checked (and possibly a correction performed) at eFA.

Depending on the determined error rate of the switched cells, the control system CTRL decides that a failure is present at the switch SA. Upon detection of a failure of the switch SA, the control system CTRL reconfigures the ingress fabric accesses iFA1, iFA3 and the egress fabric accesses eFA1, eFA3. The ingress fabric access iFA1 is configured such, that it does not split the high priority traffic flow, but such that it forwards all data cells CH1, . . . , CH4 of the high priority traffic flow to the surviving switch SB. By this, a 1:1 Equipment Protection Switch with respect to the high priority traffic flow is achieved. The ingress fabric access iFA3 is configured such, that it does not split the low priority traffic, but such that it forwards all data cells CL1, . . . , CL4 of the low priority traffic flow to the surviving switch SB. By this, a 1:1 Equipment Protection Switch with respect to the low priority traffic flow is achieved.

The high priority traffic flow is guaranteed a committed data rate by the network provider. The committed data rate can at most be that data rate, at which one single matrix SB is able to switch a traffic flow from its input interfaces to its output interfaces.

In practice, the sum of committed data rate portion of all flows is preferably chosen to be less or equal to the single matrix capacity. In the network this is guaranteed by means of traffic engineering: at network boundaries traffic flows are policed and their components in terms of committed and excess information rate are limited. Then the forwarding of flows across the network and the network's nodes is engineered by management plane or control plane so that the sum of committed rates entering a node is less or equal to the capacity of a single matrix. The low priority is general has only an excess information rate which is not committed and transferred dynamically according to the current available forwarding capacity.

The control system configures the ingress fabric accesses iFA1, iFA3, the egress fabric accesses eFA1, eFA3 and the switching matrices SA, SB, such that said high priority traffic flow is switched at said committed data rate, and such that said low priority traffic flow is switched at best effort without blocking said high priority traffic flow. The control system does so, by determining from requests REQ received from the ingress traffic managers iTM1, iTM3 the amount of cells to be switched from input interface to output interfaces and from pre-grants PGR received the egress traffic managers eTM1, eTM3 the amount of data cells the output interfaces are able to receive. Then, the control system CTLRL signals to the ingress traffic mangers iTM1, iTM3 such grants GRT, which result in a forwarding and switching of the data cells of the high priority traffic flow at the committed data rate and a forwarding and switching of the data cells of the high priority traffic flow at a data rate, such that data cells of the high priority traffic flow are not blocked by data cells of the low priority traffic flow.

In other words, the low priority flow can use the remaining uncommitted portion of capacity of a single matrix.

The system can be also implemented with three queues. In such a case, the high priority will contain the so-called granted traffic (committed rate), while the medium priority queue will contain the so-called regulated flow (committed rate plus excess information rate) and the low priority queue will contain the best effort (excess information rate). The system supports also other combination as well as hierarchical scheduling.

The high priority, medium priority and low priority queues are recognized by the tag that each packet is carrying. This tag is different technology by technology but the principles are always the same: a mapping between a tag and a so-called Per Hop Behavior (PHB) is defined; this PHB specifies which queue (e.g. high priority, low priority, etc.) and which service discipline (e.g. priority scheduling, round robin, etc). Without loosing generality the tag in case of Ethernet frames can be constituted by VLAN tag plus PRIO bits. In case of MPLS in the E-LSP forwarding mode (E-LSP: EXP Label Switching Path) can be the so-called EXP bits of the MPLS packet. In case of MPLS L-LSP forwarding mode (Label inferred Label Switching Path) the tag is the MPLS label. Then by management or control plane an association between tag and PHB is realized and this specifies the ingress queue in which the input traffic is put. Without loosing generality is given the working principle for the case of two queues with high priority traffic constituted by granted traffic with a certain committed rate and low priority traffic constituted by best effort with a certain excess information rate; in fact best effort has not a committed rate and can be treated as a special case of regulated traffic with CIR=0 and some EIR.

A guaranteed data rate for switching the high priority traffic is maintained, which means that the risk of data loss or buffer congestion at ingress ports for the high priority traffic is not increased in case of a failure of the first switch. A further advantage is, that the low priority can be still be switched and transmitted at best effort. Furthermore, in the case that the failure of the first switch leads to switching the low priority traffic flow at a data rate lower than the data rate in case of no failure, the amount by which the data rate of the low priority traffic flow is reduced can be restored, by initiating a path restoration for this amount of data rate for the low priority traffic flow at network level. This path restoration is then initiated by the control system, by sending appropriate signals over the data communication system to the other network elements of the network.

Figure 3:
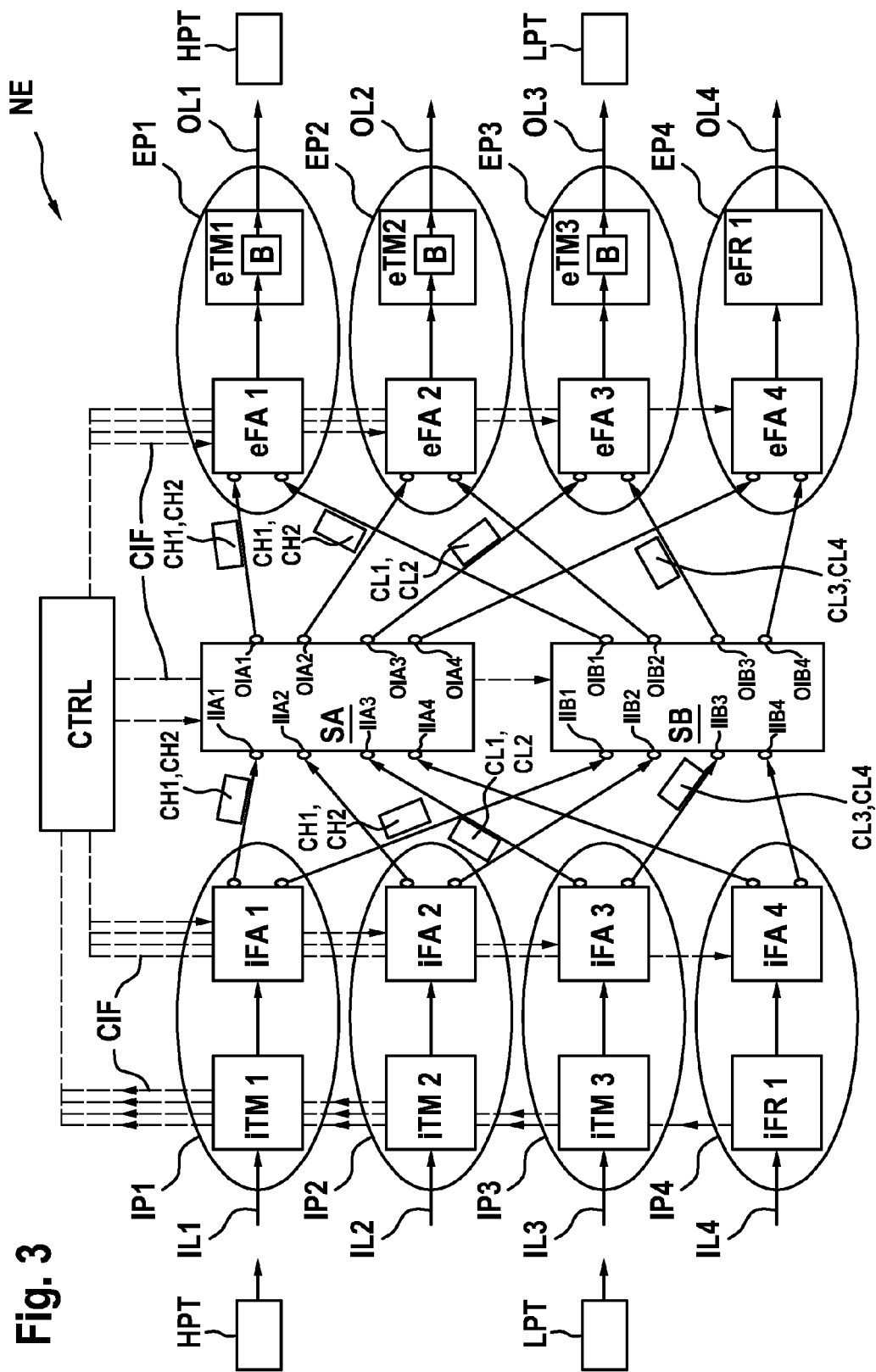
FIG. 3 shows a schematic diagram of a proposed network element in a second configuration state in case of no failure.

FIG. 3 shows the network element in a second configuration state. Both switching matrices SA, SB are working without failure.

The ingress fabric access iFA1 duplicates the data cells CH1, CH2 of the high priority traffic and sends a copy of each data cell to the first switch SA and the second switch SB. Thus, the switches SA, SB each switch the same high priority traffic flow.

The ingress fabric access iFA3 splits the low priority traffic LPT, by forwarding a fraction CL1, CL2 of the low priority traffic data cells CL1, CL2, CL3, CL4 to the first switching matrix SA and forwarding another fraction CL3, CL4 of these data cells CL1, CL2, CL3, CL4 to the second switching matrix SB. Thus, the data cells of the low priority traffic flow are split among the switches SA, SB for switching.

The configuration of the switches SA, SB in FIG. 3 is the same as previously described for FIG. 1.

The egress fabric access eFA1 reads out data cells CH1, CH2 from an output interface of only one of the switches SA, SB. The egress fabric access eFA3 reads out the data cells CL1, CL2, CL3, CL4 from output interfaces of both switches SA, SB.

In this configuration, a 1+1 Equipment Protection Switching is possible for the high priority traffic flow in case of a failure of the first switch SA, since each of the two switches SA, SB switches a copy of each data cell of the high priority traffic flow.

Furthermore, the data rate, by which the low priority traffic flow is switched by both switching matrices SA, SB, is twice as large as the data rate, if the data cells CL1, CL2, CL3, CL4 of the low priority traffic flow would not be split by the ingress fabric access iFA3 between the switches SA, SB. Therefore, the proposed configuration reduces the risk of data loss or ingress buffer congestion at the ingress port IP3.

Figure 4:
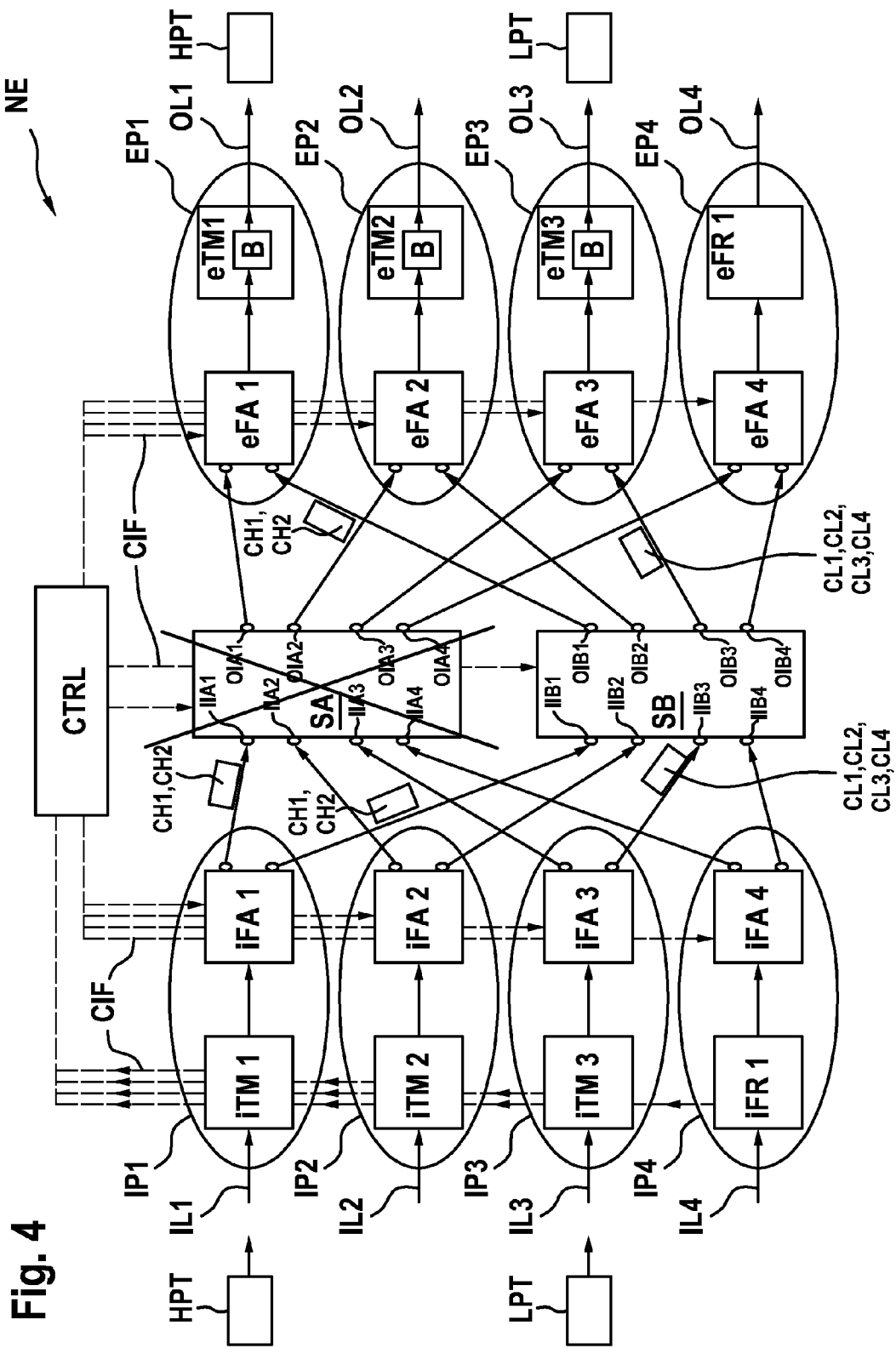
FIG. 4 shows a schematic diagram of the proposed network element in the second configuration state in case of a failure.

FIG. 4 shows the proposed network element NE in the second configuration state. The switching matrix SA is subject to a failure and can therefore not be used for switching. The switching matrix SB is working without failure.

The control system CTRL detects a failure of the switch SA, as previously described. Upon detection of the failure of the switch SA, the control system CTRL reconfigures the ingress fabric access iFA3 and the egress fabric accesses eFA1, eFA3. The configuration of the ingress fabric access iFA1 is kept unchanged. The ingress fabric access iFA3 is configured, such that it does not split the low priority traffic flow, but such that it forwards all data cells CL1, . . . , CL4 of the low priority traffic flow to the surviving switch SB. The egress fabric accesses eFA1, eFA3 are configured, such that they read out data cells only from output interfaces of the surviving switch SB. By this, a 1:1 Equipment Protection Switch with respect to the low priority traffic is achieved. Also, a 1+1 Equipment Protection Switch with respect to the high priority traffic is achieved.

The high priority traffic flow is guaranteed a committed data rate by the network provider, as previously described with regard to the first configuration state in case of a failure. The control system configures the ingress fabric accesses iFA1, iFA3, the egress fabric accesses eFA1, eFA3 and the switching matrices SA, SB, such that said high priority traffic flow is switched at said committed data rate, and such that said low priority traffic flow is switched at best effort without blocking said high priority traffic flow.

A guaranteed data rate for switching the high priority traffic flow is maintained in the case of a failure, which means that the risk of data loss or buffer congestion at ingress ports for the high priority traffic flow is not increased in case of a failure of the first switch. A further advantage is, that the low priority can be still be switched and transmitted at best effort.

It is to be understood, that the control system is also able to configure the ingress ports and the egress ports of the network element, such that a 1+1 Equipment Protection Switch is achieved for the high and the low priority traffic flow. In this case, the ingress fabric accesses and the egress fabric accesses are configured, such that the data cells of both packet traffic flows are treated as previously described with reference to FIGS. 3 and 4 for the low priority traffic flow.

The proposed network element allows switching of different packet data traffics flows of different priorities in a flexible manner, by allowing different compromises between the aims of 1+1 EPS, 1:1 EPS and fast switching of a packet data traffic at the network element for avoiding data loss or ingress buffer congestion in case of data packet bursts.

The information, which data traffic has a high priority and which data traffic has a low priority, has to be known at the network element. This information can be provided, by adding at the source node to high priority data packets a first VLAN tag, to low priority data packets a second VLAN tag and by providing to the control system of the network element information about the association of a VLAN tag to a certain priority of a data traffic. This information of association can be provided by the network manager to the control system in the form of data packets sent to the network element. An ingress traffic manager then analyses the data packet and sends the information via the control interface to the control system. Alternatively, the information of association can be provided by the network manager to the control system via the data communication network.

The control system is a processing device, such as an application specific integrated circuit (ASIC) or a Field Programmable Gate Array (FPGA), that is software driven by a control software. The control software contains control commands that can be sent over the control interface to control the switching matrices, the ingress fabric accesses and the egress fabric accesses. The control software is able to read data cells from the egress fabric accesses and to receive instructions and/or requests from the ingress traffic managers. Preferably, the control system is composed of several modular subsystems.

The ingress ports and the egress ports are provided on line cards, wherein multiple ports can be provided on one single line card. The different devices of the network element are preferably connected by a backplane connection.

To grasp the advantages of the proposed device, the following aspects may be taken into consideration. As already mentioned previously, data packets are not fixed to a certain size, but of variable size, and do not arrive with a constant frequency at a node, but randomly. Therefore, the data rate network node is not constant, but may lead to a burst of data packets. Data packets may be switched by cell switches by segmenting the data packet into data cells for switching.

A simple model of an unbuffered switch can be introduced to illustrate the technical problems solved by the proposed solution. If the switch is equipped with N input ports and N output ports, called an N×N switch, each switch port may have the same capacity. This capacity can be expressed as a rate in different units, for instance bit/sec or Cells/time unit. The time unit may be a second or a fraction of a second or also the duration of a certain time interval named time slot, wherein a time slot is the minimum inter-arrival time of cells.

Packet flows are characterized in that they have an inter-arrival time that can be variable. Furthermore, different packet flows can be asynchronous. When different asynchronous input flows reach a same output port of a switch, then a burst can be generated at this output port, even in the case that the input flows have fixed inter-arrival times; this occurs since they are mutually asynchronous. If the input flows are bursty—they have not fixed inter-arrival times—the situation can be even worse.

An instantaneous burst generated at the output port of the switch may something that the switch may not be able to handle, in which case the switch may discard the cells. For instance, consider an N×N switch where the maximum rate of each input is 1 cell per time slot and the switch is built, such that it is able to forward 1 cell per timeslot at each egress. In such a case, if two cells at two different inputs want to reach the same output during the same timeslot, this leads to a loss of one of the cells. But if the switch is for instance able to forward 2 cells in a timeslot to the same output port, then no loss occurs. It is clear that having more forwarding resources—switches—at hardware level is of advantage.

To give a quantitative description, it is necessary to introduce the concept of speedup of a switching matrix and of an output. A formal definition of a speedup of a switch is the following: A switch with a speedup of S can remove up to S packets from each input and deliver up to S packets to each output within a time slot; in the same way an output port has a speedup So when it can receive simultaneously So cells from So inputs within a timeslot.

To avoid loosing cells during congestion switches, are equipped with buffers. The way how switches are equipped with buffers define the so-called switch buffering strategy. Different buffering strategies have been proposed and implemented: input buffering, output buffering and internal switch buffering.

In the text the following naming convention is adopted: an input buffer port is a port of the possible input buffer, which receives the traffic from the line; a switch input port is the port of the switch, which receives the traffic from the input buffer; a switch output port is the port of the switch, which outputs the traffic to the possible output buffer; an output buffer port is the port of the output buffers which outputs the traffic to the line.

A reference text where these schemes are outlined is the book "Gigabit Networking, Craig Partridge, published by Addison-Wesley, Oct. 30, 1993, Chapter 5.1 to 5.4". In input buffering, a switch ingress port equipped with an input buffer in front of it can send a cell to a switch output port, which is not buffered, only when the output port is free. It can be found in technical literature that input buffering is subject to so called "head of line blocking", which means that a cell, which is waiting in an ingress queue and is destined to a certain output port and waits for this output port to become free, may block other cells, which are behind it and which are destined to other free output ports. This is the major drawback of input queuing that leads to high latency and low utilization. It can be found that with input buffering, the worst case utilization is for example 56.8% of the total capacity. On the other hands, input buffering does not require speedup, or to be more precise, it requires a speedup of 1.

Output queuing is a technique which is of advantage: all switch output ports are buffered, which means that they have a buffer behind the port, and the switch must be able to send more than one cell at a time to the same switch output port during a time slot. To avoid blocking or loss in an N×N switch, the required speedup is N. In the case that the maximum rate of each input is 1 cell/time slot, all of the N input ports can send cells simultaneously to the same switch output port without causing blocking or loss. The output buffer cannot be read from the line at the rate N but at the rate 1; thus, the output buffer stores the N−1 cells which con not be transmitted during the same timeslot. At a later point of time, at which data packets are received at a data rate lower than the data rate of transmission at the output line, the amount of data cells stored at the output buffer may be reduced, by reading them out from the buffer and transmitting them. It is important, to stress that the in an output buffered switch with a speedup of N, which is needed to avoid blocking, the output buffer has to be written at the rate N from the matrix output port and read at the rate 1 from the output line.

It can be proven, see the cited reference, that output buffering has better performances that input buffering in terms of both utilization and cells latency. Naturally, this comes at the cost of a higher speedup. In practice, output buffering is an ideal architecture in practical realization where a speedup of N is never reached due to cost. In general, a speedup smaller than N is obtained. Theoretically, if the speedup is less than N, also ingress buffers may be exploited to avoid dropping, but this comes at the price of reduced matrix utilization and increased latency; conversely, if the speedup is larger or equal to N, ingress buffers are useless.

To understand this aspect more deeply, one may consider again an N×N switch with a speedup of M, with M being smaller than N, which is equipped with output queues. In the case, that N cells from different input buffer ports have to be forwarded to the same switch output port, the result will be that N−M cells will be stored at input buffers and transmitted later on. Blocking or loss is avoided, but this comes at the price of increased latency and reduced utilization. In conclusion, input buffers, when combined with output buffers, allow a less aggressive speedup at the price of reduced performances in terms of latency and utilization.

Many variations of those schemes have been proposed: switches, where both ingress ports and egress ports are buffered, and Virtual Output Queued switches, where the head of line blocking is solved by dedicating an ingress queue to each output port, which requires ingress speedup. In all these cases, the speedup is beneficial to reduce latency and to increase utilization; in technical literature, the ideal output queued switch is assumed as a reference to measure performances of more complex buffering and control schemes that by reasons of cost have to be realized with a speedup smaller than the one of ideal output buffered systems.

As previously outlined, FIG. 1 shows a schematic diagram of the proposed network element in a first configuration state in case of no failure. As a further embodiment, FIG. 6 shows a schematic diagram of the proposed network element in a further first configuration state in case of no failure.

FIG. 6 shows the network element NE' with all elements as previously described with regard to FIG. 1. Furthermore, addition to the elements described in FIG. 1, the network element NE' contains at the ingress port IP1 respective ingress subports IL1.1 and IL1.2, via which respective ingress flows may be received. Furthermore, the ingress port IP3 contains respective ingress subports IL3.1 and IL3.2, via which respective ingress flows may be received. The network element NE' contains at the egress port EP1 respective egress subports OL1.1 and OL1.2, via which respective egress flows may be transmitted. Furthermore, the egress port EP3 contains respective egress subports OL3.1. and OL3.2, via which respective egress flows may be transmitted. Furthermore, the egress port EP4 contains respective egress subports OL4.1. and OL4.2, via which respective egress flows may be transmitted.

In the first configuration shown in FIG. 1, the data cells CH1 and CH2 are forwarded by the ingress fabric access iFA1 to the input interface IIA1 of the first switching matrix SA. In contrast to this, as shown in FIG. 6, the splitting of the high priority traffic flow is performed in a more advanced manner, assuming that the index of data cells CH1, CH2, CH3, CH4 indicates the order of these data cells in which they form a traffic flow.

At the ingress port IP1, the data packets of the high priority traffic flow are segmented by the traffic manager iTM1 into data cells CH1, CH2, CH3, CH4 carrying data of the high priority traffic HPT. The ingress fabric access iFA1 splits the high priority traffic HPT, by forwarding a fraction CH1, CH3 of the high priority traffic data cells CH1, CH2, CH3, CH4 to the input interface IIA1 of the first switching matrix SA and forwarding another fraction CH2, CH4 of the data cells CH1, CH2, CH3, CH4 to the input interface IIB1 of the second switching matrix SB. Thus, the high priority traffic flow is split among the switches SA, SB for switching.

The split takes place at single flow level which is split in two fractions. Moreover the split operation is characterized in that: 1) it is deterministic; 2) it is synchronous.

Being deterministic implies that given the ingress flow the amount and temporal position of each fraction of the flow in each matrix is predetermined according to a given splitting rule. Being synchronous means that two fractions of the same flow are temporally aligned to matrix synchronization signals. The most important consequence of this is that at egress when fractions are recombined to rebuild the input flow this can be done without reordering and this is a big advantage for complexity, latency, cost and power; in fact reordering out of order items (chunks, frames, cells or whatever) need buffering resources. Moreover, even if not strictly required from the invention, in the applicant technology fragment of cells named chunks are switched thus further reducing latency.

In this example, the deterministic rule is that the cell CH1 is forwarded to the first matrix SA while the next following cell CH2 is forwarded to the second matrix SB. Furthermore, the splitting is synchronous, since the two cells CH1 and CH2 are forwarded by the ingress fabric access iFA1 at the same time to the matrices SA and SB. At the egress fabric access eFA1, these two cells CH1 and CH2 arrive at the same time; since the deterministic rule determines the order of theses cells by the matrices by which they were switched, the egress fabric access eFA1 implicitly knows in which order these cells CH1 and CH2 have to be combined. The same considerations hold for the cells CH3 and CH4 at a later time instance.

Just as the splitting of the flow HPT is performed into the cells CH1, CH2, CH3 and CH4 by the ingress fabric access iFA1, the splitting of the flow LPT is performed into the cells CL1, CL2, CL3 and CL4 by the ingress fabric access iFA3.

Figure 7:
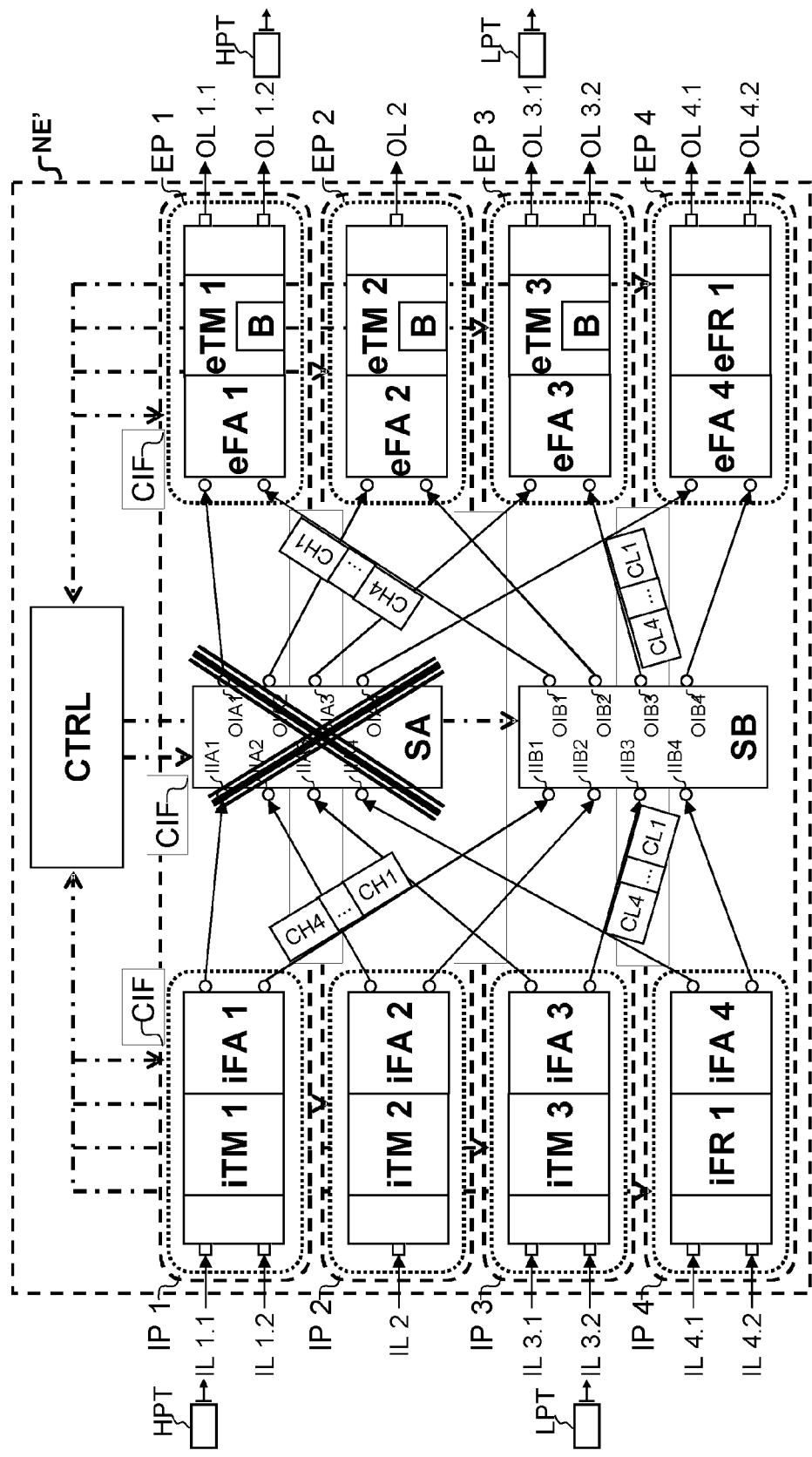
FIG. 7 shows the proposed network element in the further first configuration state in the case of a failure.

FIG. 6 shows the schematic diagram of the proposed network element in the further first configuration state in case of no failure. FIG. 7 shows the proposed network element in the further first configuration state in the case of a failure. As shown in FIG. 7, the ingress fabric access iFA1 forwards the data cells CH1, CH2, CH3 and CH4 to the matrix SB in the order of these data cells. Furthermore, the ingress fabric access iFA3 forwards the data cells CL1, CL2, CL3 and CL4 to the matrix SB in the order of these data cells.

Figure 8:
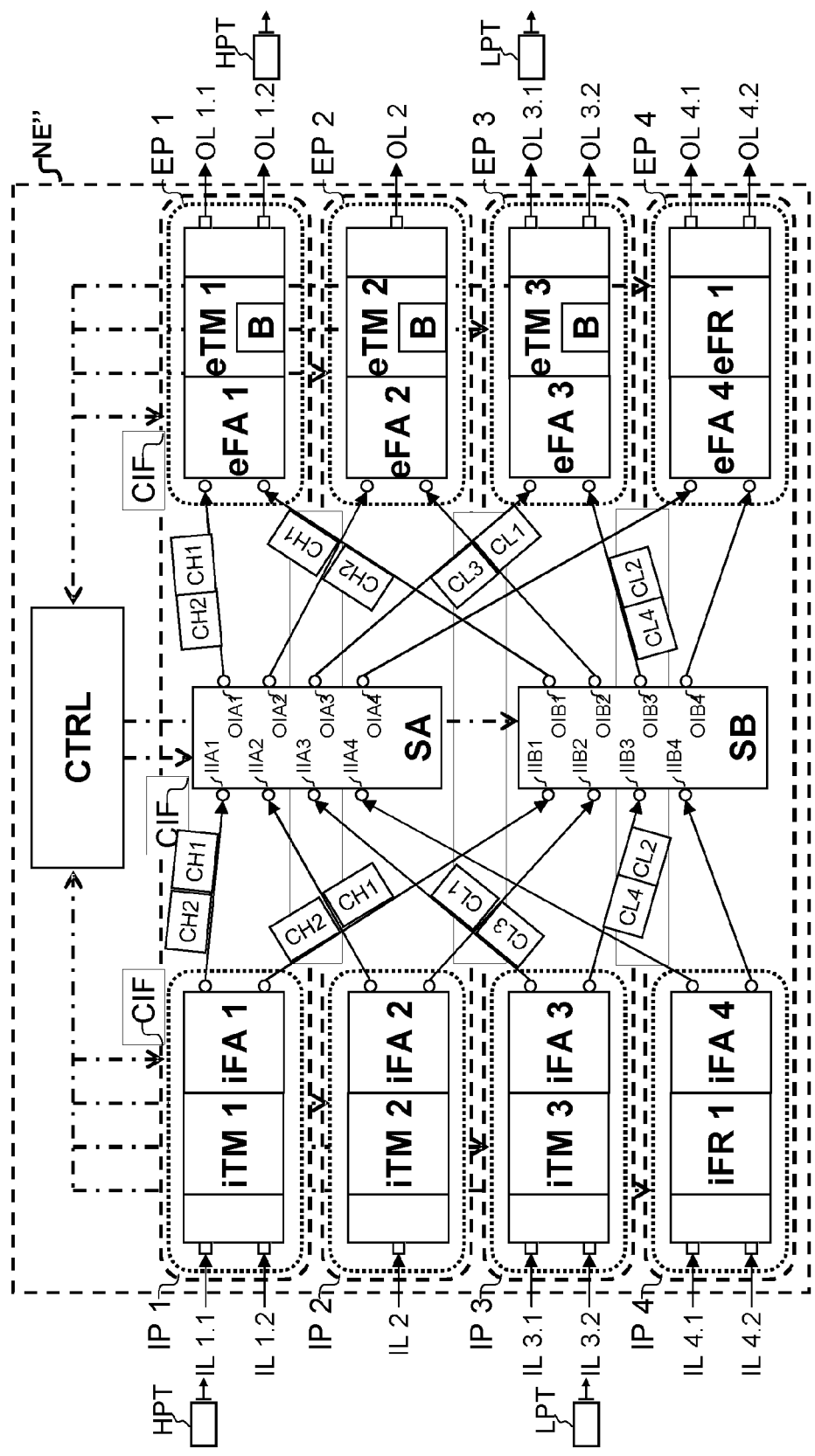
FIG. 8 shows a schematic diagram of the proposed network element in a further second configuration state in case of no failure.

FIG. 8 shows a schematic diagram of the proposed network element NE" in a further second configuration state in case of no failure. The elements of the network element NE" are in general the same as the elements shown in FIG. 6. In this further second configuration state shown in FIG. 8, the splitting of the flows is deterministic and synchronous. In this example, the cell CH1 is forwarded by the ingress fabric access iFA1 to the first matrix SA and the second matrix SB. At a next time instance, the cell CH2 is forwarded by the ingress fabric access iFA1 to the first matrix SA and the second matrix SB. In this example, the deterministic rule is that the cell CL1 is forwarded by the ingress fabric access iFA3 to the first matrix SA while the next following cell CL2 is forwarded to the second matrix SB. Furthermore, the splitting is synchronous, since the two cells CL1 and CL2 are forwarded by the ingress fabric access iFA3 at the same time instance to the matrices SA and SB. At the egress fabric access eFA3, these two cells CL1 and CL2 arrive at the same time; since the deterministic rule determines the order of theses cells by the matrices by which they were switched, the egress fabric access eFA3 implicitly knows in which order these cells CL1 and CL2 have to be combined. The same considerations hold for the cells CL3 and CL4 at a later time instance.

Figure 9:
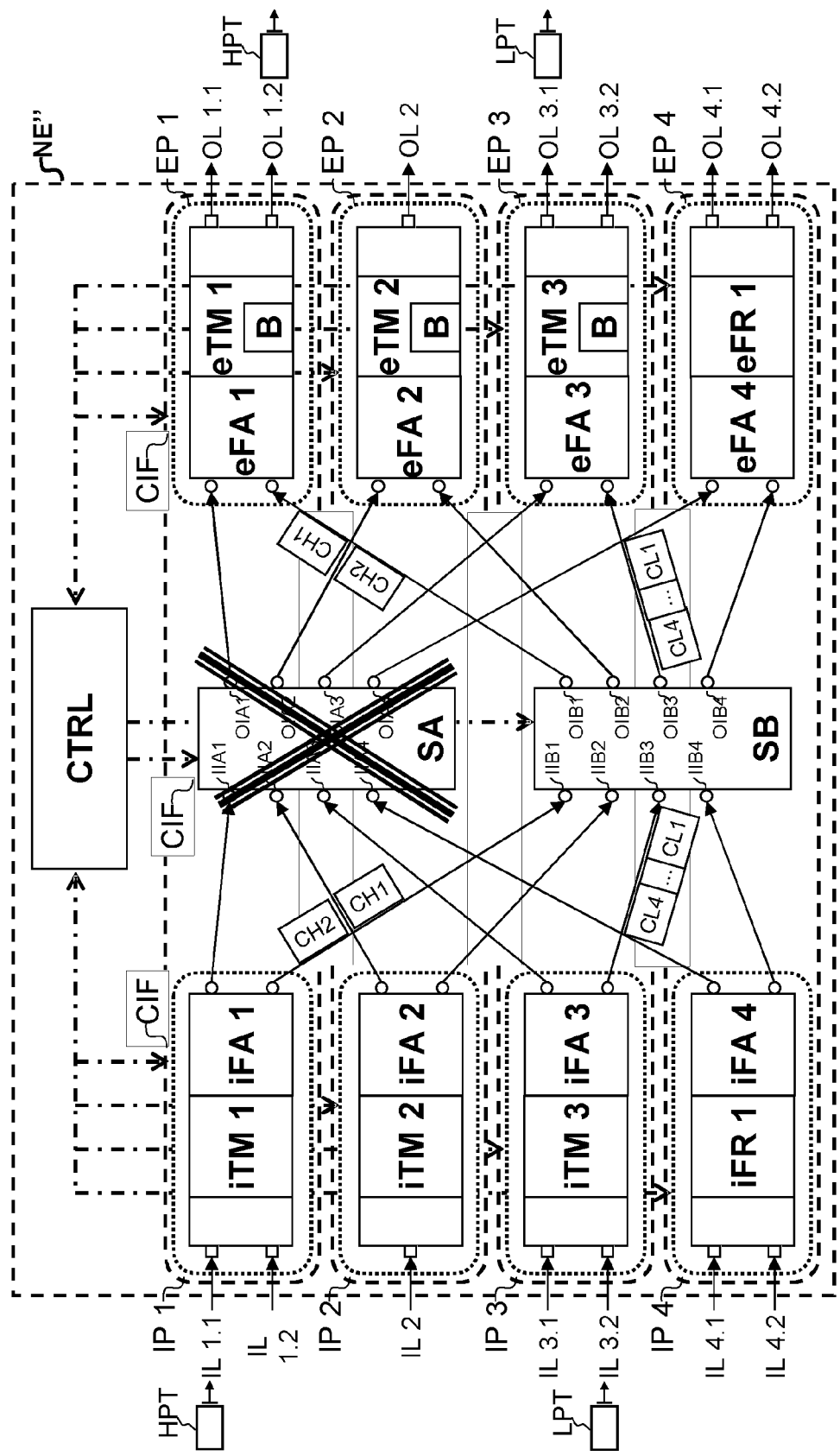
FIG. 9 shows the proposed network element in the further second configuration state in the case of a failure.

FIG. 9 shows the proposed network element NE" in the further second configuration state in the case of a failure. As shown in FIG. 9, the ingress fabric access iFA1 forwards the data cells CH1, CH2 to the matrix SB in the order of these data cells. Furthermore, the ingress fabric access iFA3 forwards the data cells CL1, CL2, CL3 and CL4 to the matrix SB in the order of these data cells.

The invention claimed is:

1. A network element for a digital transmission network, comprising:
    a number of ingress ports, comprising:
        at least one time division multiplex ingress port adapted to receive a time division multiplex traffic flow and to segment said time division multiplex traffic flow into data cells of fixed size carrying said time division multiplex traffic flow, and
        at least one packet traffic ingress port adapted to receive a packet traffic flow and to segment said packet traffic flow into data cells of fixed size carrying said packet traffic flow;
    a number of egress ports, comprising:
        at least one packet egress port comprising a buffer adapted to store data cells received from one or more of said packet ingress ports and/or data packets reassembled from said data cells received from one or more of said packet ingress ports;
    a first and a second cell switching matrix, wherein each cell switching matrix is adapted to switch data cells from any of said ingress ports to any of said egress ports;
    a control system for controlling the configuration of said ingress ports, said egress ports and said cell switching matrices;
    wherein said control system is adapted to configure,
        said time division multiplex ingress port to duplicate and forward said data cells carrying said time division multiplex traffic flow to said first cell switching matrix and said second cell switching matrix, and
        said packet traffic ingress port to split said packet traffic flow, by forwarding a first fraction of said data cells carrying said packet traffic flow to said first cell switching matrix and forwarding a second fraction of said data cells carrying said packet traffic flow to said second cell switching matrix; and
    wherein said control system is adapted to reconfigure said packet traffic ingress port, in case of a failure of one of said first and second cell switching matrices, to forward said data cells carrying said packet traffic flow to the other of said first and said second cell switching matrices.

2. The network element according to claim 1, wherein said control system is adapted to configure one or more of said packet ingress ports receiving a plurality of packet traffic flows,
    to split at least one of said packet traffic flows, by forwarding a first fraction of data cells carrying a first fraction of said at least one packet traffic flow to said first cell switching matrix and forwarding a second fraction of data cells carrying said at least one packet traffic flow to said second cell switching matrix, and
    to duplicate and forward data cells carrying another of said packet traffic flows to said first cell switching matrix and said second cell switching matrix.

3. The network element according to claim 2, wherein said at least one packet traffic flow that is split has a priority lower than said another of said packet traffic flows.

4. The network element according to claim 2, wherein said control system is adapted to configure said packet traffic ingress port and said cell switching matrices to switch at least one of said packet traffic flows at a predefined data rate.

5. A method of switching traffic flows through a network element of a digital transmission network, comprising:
    receiving a time division multiplex traffic flow and segmenting said time division multiplex traffic flow into data cells of fixed size carrying said time division multiplex traffic flow traffic flow;
    receiving a packet traffic flow and segmenting said packet traffic flow into data cells of fixed size carrying said packet traffic flow;
    providing a first cell switching matrix and a second cell switching matrix for switching data cells to one or more of a number of egress ports; and
    at one of said egress ports, buffering data cells carrying said packet traffic flow or data packets reassembled from said data cells carrying said packet traffic flow;

wherein
said data cells carrying said TDM traffic flow are duplicated and forwarded to said first and said second cell switching matrix, and said packet traffic flow is split, by forwarding a first fraction of said data cells carrying said packet traffic flow to said first cell switching matrix and forwarding a second fraction of said data cells carrying said packet traffic flow to said second cell switching matrix;

the method further comprising, in case of a failure of one of said first and second cell switching matrices, forwarding said data cells carrying said packet traffic flow to the other of said first and said second cell switching matrices.

6. The method according to claim 5, further comprising:
splitting at least one of a plurality of received packet traffic flows, by forwarding a first fraction of data cells carrying a first fraction of said at least one packet traffic flow to said first cell switching matrix and forwarding a second fraction of data cells carrying said at least one packet traffic flow to said second cell switching matrix; and duplicating and forwarding data cells carrying another of said packet traffic flows to said first cell switching matrix and said second cell switching matrix.

7. The method according to claim 6, wherein said at least one packet traffic flow that is split has a priority lower than said another of said packet traffic flows.

8. The method according to claim 6, further comprising switching said at least one of said packet traffic flows at a predefined data rate.

9. The network according to claim 1, wherein said at least one packet traffic ingress port does not comprise a buffer.

10. The network element according to claim 3, wherein said control system is adapted to configure said packet traffic ingress port and said cell switching matrices to switch at least one of said packet traffic flows at a predefined data rate.

* * * * *